US011252737B2

(12) United States Patent
Reimann et al.

(10) Patent No.: US 11,252,737 B2
(45) Date of Patent: Feb. 15, 2022

(54) APPARATUS, METHOD AND COMPUTER PROGRAM FOR DETERMINING ONE OR MORE RADIO RESOURCES TO BE USED FOR PERFORMING A WIRELESS COMMUNICATION OVER A SIDELINK OF A MOBILE COMMUNICATION SYSTEM

(71) Applicant: VOLKSWAGEN AKTIENGESELLSCHAFT, Wolfsburg (DE)

(72) Inventors: Daniel Reimann, Braunschweig (DE); Guillaume Jornod, Berlin (DE); Steffen Schmitz, Wesel (DE)

(73) Assignee: Volkswagen Aktiengesellschaft

( * ) Notice: Subject to any disclaimer, the term of this patent is extended or adjusted under 35 U.S.C. 154(b) by 23 days.

(21) Appl. No.: 16/860,939

(22) Filed: Apr. 28, 2020

(65) Prior Publication Data

US 2020/0344764 A1  Oct. 29, 2020

(30) Foreign Application Priority Data

Apr. 29, 2019  (EP) .................................... 19171574

(51) Int. Cl.
*H04L 5/00* (2006.01)
*H04W 72/08* (2009.01)
(Continued)

(52) U.S. Cl.
CPC ......... *H04W 72/082* (2013.01); *H04L 5/0073* (2013.01); *H04W 16/10* (2013.01); *H04W 72/0426* (2013.01); *H04W 84/045* (2013.01)

(58) Field of Classification Search
CPC . H04W 36/0055; H04W 76/18; H04W 24/04; H04W 72/14; H04W 72/04;
(Continued)

(56) References Cited

U.S. PATENT DOCUMENTS 10,716,154 B2   7/2020 Feng
2016/0295624 A1  10/2016 Novlan et al.
(Continued)

FOREIGN PATENT DOCUMENTS

AU   2017262847 A1   11/2018
EP       3386256 A1   10/2018
(Continued)

OTHER PUBLICATIONS

China Telecom; Sidelink Resource Allocation Mechanism for NR V2X; 3GPP TSG RAN WG1 Meeting #95; Nov. 12-16, 2018; Spokane, Washington, United States of America.
(Continued)

*Primary Examiner* — Phuoc H Doan
(74) *Attorney, Agent, or Firm* — Barnes & Thornburg LLP

(57) ABSTRACT

An apparatus, a method and a computer program for determining one or more radio resources to be used for performing a wireless communication over a sidelink of a mobile communication system. The method includes estimating a level of interference, selecting a way to determine the one or more radio resources based on the level of interference, and determining the one or more radio resources to be used for performing a wireless communication over the sidelink of the mobile communication system based on the selected method or mechanism. The way to determine the one or more radio resources based on the level of interference is selected from among elements of the group of using predefined radio resources, the group using a decentralized coordination of radio resources, and the group using a base station-based assignment of radio resources.

21 Claims, 2 Drawing Sheets

(51) Int. Cl.
*H04W 16/10* (2009.01)
*H04W 72/04* (2009.01)
*H04W 84/04* (2009.01)

(58) Field of Classification Search
CPC ......... H04W 92/18; H04W 4/08; H04W 4/40; H04W 72/02; H04W 72/005; H04W 72/0453; H04W 4/06; H04W 72/0446; H04L 1/1819; H04L 1/1896
See application file for complete search history.

(56) References Cited

U.S. PATENT DOCUMENTS

2018/0227882 A1   8/2018 Freda et al.
2020/0092685 A1*  3/2020 Fehrenbach ......... H04B 7/2606

FOREIGN PATENT DOCUMENTS

| JP | 2013179555 A | 9/2013 |
| KR | 20180108589 A | 10/2018 |
| WO | 2017165087 A1 | 9/2017 |

OTHER PUBLICATIONS

Intel Corporation; Sidelink control by NR and LTE Uu Interfaces for V2X use cases; 3GPP TSG RAN WG1 Ad-Hoc Meeting 1901; Jan. 21-25, 2019; Taipai, Taiwan.
Huawei; 3GPP TSG RAN WG1 Meeting #96bis; Apr. 8-12, 2019; Xi'an, China.
Office Action for Korean Patent Application No. 10-2020-0051807; dated Sep. 15, 2021.

\* cited by examiner

APPARATUS, METHOD AND COMPUTER PROGRAM FOR DETERMINING ONE OR MORE RADIO RESOURCES TO BE USED FOR PERFORMING A WIRELESS COMMUNICATION OVER A SIDELINK OF A MOBILE COMMUNICATION SYSTEM

PRIORITY CLAIM

This patent application claims priority to European Patent Application No. 19171574.7, filed 29 Apr. 2019, the disclosure of which is incorporated herein by reference in its entirety.

SUMMARY

Illustrative embodiments relate to an apparatus, a method and a computer program for determining one or more radio resources to be used for performing a wireless communication over a sidelink of a mobile communication system, more specifically, but not exclusively, to determining the one or more radio resources to be used for performing a wireless communication over the sidelink of a mobile communication system based on an estimated level of interference.

BRIEF DESCRIPTION OF THE DRAWINGS

Exemplary embodiments will be described using the following non-limiting embodiments of apparatuses or methods or computer programs or computer program products by way of example only, and with reference to the accompanying figures, in which.

DETAILED DESCRIPTION

Figure 1A:
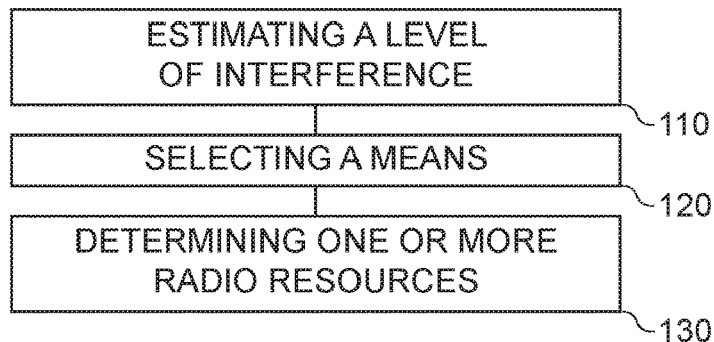
FIGS. 1a and 1b show flow charts of embodiments of a method for determining one or more radio resources to be used for performing a wireless communication over a sidelink of a mobile communication system.

Vehicular communication is a field of research and development. To enable an autonomous or semi-autonomous driving of the transportation vehicles, transportation vehicles are expected to use Vehicle-to-Vehicle-Communication (V2V) and Vehicle-to-Network (V2N) communication, e.g., to coordinate driving maneuvers and/or to receive tele-operated driving instructions. This communication is generally wireless, i.e., transportation vehicles may wirelessly communicate with other transportation vehicles in their vicinity and/or with backend services via cellular mobile communication systems.

Patent application U.S. Ser. No. 15/080,485 A1 relates to a method and an apparatus for resource pool designs to support transportation vehicle communications. In this application, various concepts for direct V2V or D2D communication are disclosed. In the application, pools of wireless resources are used to assign wireless resources to periodic or event-triggered traffic.

Patent application EP 3 386 256 A1 relates to a method for transmitting data via a sidelink. In this application, in an out-of-coverage scenario, a scheduling of wireless resources for sidelink communication may be performed by a terminal for other terminals.

Patent application WO 2017-165087 A1 relates to communications over a sidelink in V2V communications. In this application, listen-before-talk is used, e.g., in conjunction with a fixed or variable contention window.

Patent application AU 2017262847 A1 relates a network architecture, a method and devices for a wireless communication network. The application discloses a multitude of concepts to be used in a 5th generation wireless communication network.

CHINA TELECOM: "Sidelink Resource Allocation Mechanism for NR V2X", 3GPP DRAFT; R1-1813087, submitted for 3GPP TSG RAN WG1 Meeting #95 in Spokane, discloses various mechanism for selecting wireless resources to use for sidelink communication between transportation vehicles.

As wireless communication occurs over a shared medium, which may be limited by the availability of radio resources, there may be a desire to provide an improved concept for radio resource management for a wireless communication over a sidelink of a mobile communication system.

Disclosed embodiments are based on the finding that, to increase a usage of available radio resources while maintaining a high transmission success rate, a level of interference may be estimated, e.g., by a transportation vehicle, and based on the level of interference, a method or mechanism for determining one or more radio resources may be selected. Using this method or mechanism, the radio resources to be used may be determined. For example, one method or mechanism for determining the one or more radio resources is to use pre-defined radio resources, e.g., radio resources that have been pre-allocated by a base station of the mobile communication system, and that are available for general usage in an out-of-coverage scenario. This may be useful in scenarios with a low interference level, as a probability of collision is not too high. In case a higher level of interference is estimated, a decentralized coordination of radio resources may be used for determining the one or more radio resources, e.g., using listen-before-talk, forward error correction, frequency hopping etc. In case the level of interference is estimated to be high, a base station-based assignment of radio resources may be used. In an in-coverage scenario, the stationary base station of the mobile communication system may be used, while in an out-of-coverage scenario, a transportation vehicle, such as a transportation vehicle performing the method, may act as base station and assign the radio resources to the transportation vehicle and to one or more further transportation vehicles communicating with the transportation vehicle.

Disclosed embodiments provide a method for determining one or more radio resources to be used for performing a wireless communication over a sidelink of a mobile communication system. The method comprises estimating a level of interference. The method comprises selecting a method or mechanism for determining the one or more radio resources based on the level of interference. The method or mechanism is selected among elements of the group of using pre-defined radio resources, using a decentralized coordination of radio resources, and using a base station-based assignment of radio resources. The method comprises determining the one or more radio resources to be used for performing a wireless communication over the sidelink of a mobile communication system based on the selected method or mechanism. This may provide an improved concept for radio resource management for the wireless communication over the sidelink of the mobile communication system.

In at least some disclosed embodiments, two or three levels of interference are distinguished when determining the level of interference. This may enable a distinction between different types of situations, for which there are different method or mechanism for determining the one or more radio resources.

Accordingly, each of the two or three levels of interference may be associated with an element of the group. This may enable a rule-based selection of the appropriate method or mechanism.

In at least some disclosed embodiments, three levels of interference are distinguished when determining the level of interference, a first level, a second level, and a third level. The pre-defined radio resources may be used at the first level. The decentralized coordination may be used at the second level. The base station-based assignment of radio resources may be used at the third level. Each of the methods or mechanisms has benefits that are suitable to the level of interference.

For example, the third level of interference may indicate a higher intensity of the interference than the second level of interference. The second level of interference may indicate a higher level of interference than the first level of interference. Accordingly, a base station-based assignment of radio resources may be more suitable for high interference situations than pre-defined radio resources.

Not all of the methods or mechanisms may be available at all times. For example, the method or mechanism may be selected among elements of the group of using pre-defined radio resources and using a decentralized coordination of radio resources while an entity executing the method is out of coverage of a base station of the mobile communication system. The method or mechanism may be selected among elements of the group of using pre-defined radio resources, using a decentralized coordination of radio resources, and using a base station-based assignment of radio resources while the entity executing the method is in coverage of a base station of the mobile communication system. This may acknowledge of an unavailability of a base station-based assignment mechanism in an out-of-coverage scenario.

Alternatively, an entity executing the method may perform the duties of the base station. For example, the method or mechanism may be selected among elements of the group of using pre-defined radio resources, using a decentralized coordination of radio resources, and using a base station-based assignment of radio resources regardless of whether an entity executing the method is in coverage or out of coverage of a base station of the mobile communication system. In this case, the base station-based assignment of radio resources may be provided by the entity that executes the method or by a further terminal, e.g., a communication partner of the wireless communication over the sidelink.

In at last some disclosed embodiments, the method is executed by a transportation vehicle. The wireless communication over the sidelink of the mobile communication system may be a communication between the transportation vehicle and one or more further transportation vehicles. The base station-based assignment of radio resources may be performed by the transportation vehicle or by a transportation vehicle of the one or more further transportation vehicles acting as a vehicular base station. This may enable a base station-based assignment mechanism in an out-of-coverage scenario.

In some disclosed embodiments, the method may further comprise assigning radio resources to be used for performing a further wireless communication over the sidelink of the mobile communication system to the one or more further transportation vehicles. The transportation vehicle performing the method may act as base station and perform the base-station based assignment of the radio resources.

For example, the method may be executed by a transportation vehicle. The wireless communication over the sidelink of the mobile communication system may be a communication between the transportation vehicle and one or more further transportation vehicles. The mobile communication system may be a vehicular mobile communication system. For example, the wireless communication may be one of intra-cluster communication, inter-cluster communication, intra-platoon communication and inter-platoon communication between the transportation vehicle and the one or more further transportation vehicles. Vehicular communication may greatly benefit from disclosed embodiments, as out of coverage scenarios are a part of vehicular communication.

For example, the decentralized coordination of radio resources may be based on one or more elements of the group of using listen-before-talk, using forward error correction, using frequency hopping, using frequency interleaving, using random hopping and using a vehicle-specific random seed to determine the one or more radio resources. These method or mechanism may enable the decentralized coordination of radio resources, e.g., in a scenario with an intermediate level of interference.

In at least some disclosed embodiments, the level of interference is estimated for a position or trajectory of a transportation vehicle executing the method. This may enable an estimation that takes into account future changes in the interference, e.g., due to road conditions.

For example, the method may be executed by a transportation vehicle. The wireless communication over the sidelink of the mobile communication system may be a communication between the transportation vehicle and one or more further transportation vehicles. The method may comprise receiving one or more wireless messages having a content that is indicative of the level of interference from the one or more further transportation vehicles. This may enable the use of implicit or explicit interference indicators that originate from the one or more further transportation vehicles.

Disclosed embodiments further provide a computer program having a program code for performing the method, when the computer program is executed on a computer, a processor, or a programmable hardware component.

Disclosed embodiments further provide an apparatus for determining one or more radio resources to be used for performing a wireless communication over a sidelink of a mobile communication system. The apparatus comprises an interface for communicating in the mobile communication system. The apparatus comprises a control module configured to estimate a level of interference. The control module is configured to select a method or mechanism for determining the one or more radio resources based on the level of interference, wherein the method or mechanism is selected among elements of the group of using pre-defined radio resources, using a decentralized coordination of radio resources, and using a base station-based assignment of radio resources. The control module is configured to determine the one or more radio resources to be used for performing a wireless communication over the sidelink of a mobile communication system based on the selected method or mechanism.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, disclosed embodiments thereof are shown by way of example in the figures and will herein be described in detail. It should be understood, however, that there is no intent to limit example embodiments to the particular forms disclosed. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1B:
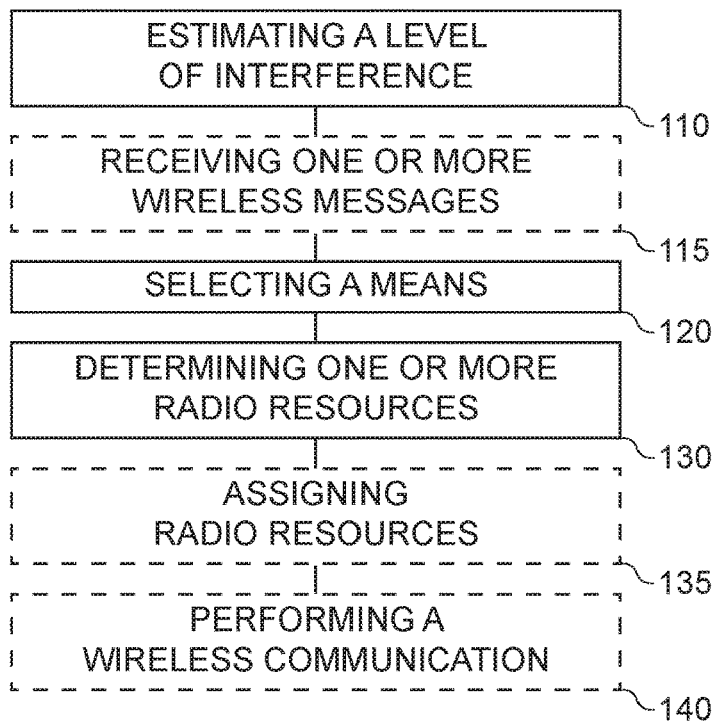

FIGS. 1a and 1b show flow charts of disclosed embodiments of a method for determining one or more radio resources to be used for performing a wireless communication over a sidelink of a mobile communication system 300. The method comprises selecting 120 a method or mechanism for determining the one or more radio resources based on the level of interference. The method or mechanism is selected among elements of the group of using pre-defined radio resources, using a decentralized coordination of radio resources, and using a base station-based assignment of radio resources. The method comprises determining 130 the one or more radio resources to be used for performing a wireless communication over the sidelink of the mobile communication system 300 based on the selected method or mechanism. Optionally, the method may further comprise performing 140 the wireless communication over the sidelink of the mobile communication system based on the determined one or more radio resources.

Figure 1C:
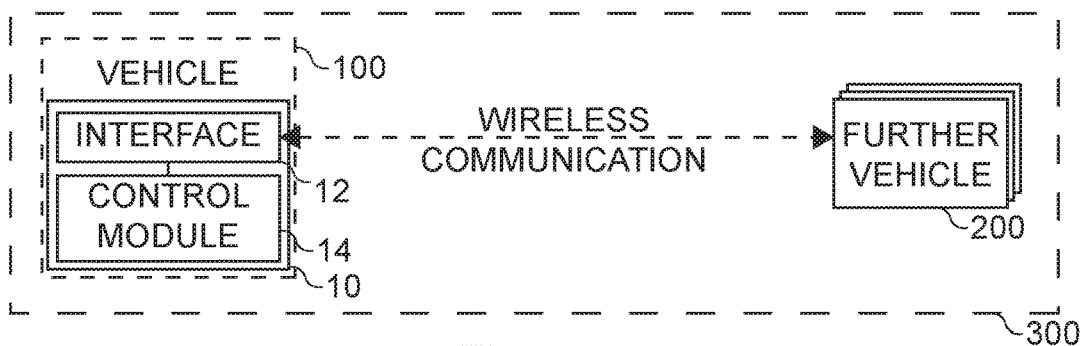
FIG. 1c shows a block diagram of an embodiment of an apparatus for determining one or more radio resources to be used for performing a wireless communication over a sidelink of a mobile communication system.

FIG. 1c shows a block diagram of an exemplary embodiment of a (corresponding) apparatus 10 for determining the one or more radio resources to be used for performing the wireless communication over the sidelink of the mobile communication system 300. The apparatus 10 comprises an interface 12 for communicating in the mobile communication system 300. The apparatus 10 further comprises a control module 14 that is coupled to the interface 12. The control module 14 may be configured to execute the method introduced in connection with FIGS. 1a and/or 1b. For example, the control module 14 is configured to estimate the level of interference. The control module 14 is configured to select the method or mechanism for determining the one or more radio resources based on the level of interference. The method or mechanism is selected among elements of the group of using pre-defined radio resources, using a decentralized coordination of radio resources, and using a base station-based assignment of radio resources. The control module 14 is configured to determine the one or more radio resources to be used for performing a wireless communication over the sidelink of the mobile communication system 300 based on the selected method or mechanism. FIG. 1c further shows an entity 100, e.g., a transportation vehicle 100, comprising the apparatus 10. FIG. 1c further shows the mobile communication system 300 comprising the entity/transportation vehicle 100 and one or more further transportation vehicles 200.

The following description relates to both the method of FIGS. 1a and/or 1b and to the apparatus 10 of FIG. 1c Disclosed embodiments provide a method, an apparatus and a computer program for determining one or more radio resources to be used for performing a wireless communication over the sidelink of a mobile communication system 300. Disclosed embodiments may be used to improve the transmission reliability of the wireless communication over the sidelink in an out-of-coverage scenario, as in such cases, a scheduling of the wireless communication by a stationary base station of the mobile communication system might not be available. Instead, a method or mechanism for determining the radio resources to be used for performing the wireless communication may be selected based on the level of interference, e.g., to avoid retransmissions. In disclosed embodiments, the wireless communication may be control instructions that are transmitted between the transportation vehicle and the one or more further transportation vehicles, e.g., cluster-related control instructions or platoon-related control instructions. In some disclosed embodiments, the method apparatus and computer program might only be used in an out-of-coverage scenario. Alternatively, the method, apparatus and computer program may be used both in- and out-of-coverage. For example, the one or more radio resources may comprise one or more elements of the group of a frequency resources, a time resources, a code resource and a spatial resources. In general, in mobile communication system, a concept denoted "resource blocks" is used. A resource block may correspond to a radio resource that spans a pre-defined period of time (e.g., a slot of a physical layer frame of a frame structure of the mobile communication system) and a frequency range (e.g., a portion of a frequency range being used by the mobile communication system). For example, in LTE (Long Term Evolution, a mobile communication system), a resource block is 180 kHz wide in frequency, and 1 slot long in time. In some cases, other parameters, such as a code resource or a spatial resource, may be further used to define a resource block. In disclosed embodiments, the one or more radio resources to be used for performing a wireless communication over the sidelink of the mobile communication system may be one or more resource blocks of the mobile communication system.

In general, the mobile communication system 300 may, for example, correspond to one of the Third Generation Partnership Project (3GPP)-standardized mobile communication networks, where the term mobile communication system is used synonymously to mobile communication network. The mobile or wireless communication system may correspond to, for example, a 5th Generation system (5G), a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

The method may be executed by a transportation vehicle 100. Accordingly, the transportation vehicle 100 may comprise the apparatus 10. The wireless communication over the sidelink of the mobile communication system 300 may be a communication between the transportation vehicle 100 and one or more further transportation vehicles 200. For example, the transportation vehicle 100 and the one or more further transportation vehicles may be part of a cluster or platoon, e.g., of the same cluster or platoon, or of different clusters or platoons. Accordingly, the wireless communication over the sidelink of the mobile communication system may be one of intra-cluster communication, inter-cluster communication, intra-platoon communication and inter-platoon communication between the transportation vehicle 100 and the one or more further transportation vehicles 200. Accordingly, the mobile communication system 300 may be a vehicular mobile communication system 300.

In at least some disclosed embodiments, the mobile communication system may be a vehicular communication system, e.g., a vehicle-to-network (V2N) or vehicle-to-vehicle (V2V) communication system. For example, the mobile communication system may be or may be based on a C-V2X (Cellular-Vehicle-to-Anything, which may comprise Long Term Evolution Vehicle-to-Anything, LTE-V2X, and 5th generation mobile communication system V2X, 5G-V2X) mobile communication system. The mobile communication system may support two communication modes: PC5, which is used between transportation vehicles, and Uu, which is used between transportation vehicles and base stations. Using PC5 and Uu, the mobile communication system may support direct vehicle-to-vehicle communication (without involvement of a base station as a communication hop, using PC5, either managed by the base station or autonomously), vehicle-to-vehicle communication via a base station of the mobile communication system, and vehicle-to-network communication via a base station of the mobile communication system. In disclosed embodiments, the wireless communication over the sidelink may be based on PC5, and may be a form of direct vehicle-to-vehicle communication.

The method comprises estimating 110 a level of interference. For example, the level of interference may be indicative of an amount of interference the wireless communication over the sidelink of the mobile communication system is predicted to be subject to. Accordingly, the level of interference may be estimated for a position or trajectory of an entity, e.g., the transportation vehicle 100, executing the method. Additionally, the level of interference may be estimated for a position or trajectory of one or more communication partners of the wireless communication, e.g., for a position or trajectory of the one or more further transportation vehicles 200. In this context, the level of interference may be estimated for a point in time, i.e., the point in time at which the wireless communication is likely to occur. Alternatively or additionally, the level of interference may be estimated for a time interval, e.g., a moving time interval relative to a current time. In this case, the level of interference to be used may be a highest level of interference that is estimated over the time interval.

To make the subsequent selection of the method or mechanism easier, (exactly) two or (exactly) three levels of interference might distinguished when determining the level of interference. For example, if two levels of interference are distinguished, a first level of interference (i.e., a low level) and a second level of interference (i.e., a high level) may be distinguished. If three levels of interference are distinguished, a first level of interference (i.e., a low level), a second level of interference (i.e., an intermediate level) and a third level (i.e., a high level) may be distinguished. The third level of interference may indicate a higher intensity of the interference than the second level of interference. The second level of interference may indicate a higher level of interference than the first level of interference.

In at least some disclosed embodiments, the level of interference may be based on a measurement of radio activity by an entity executing the method. Accordingly, the method may comprise performing the measurement of the radio activity in a vicinity of the entity executing the method (e.g., the transportation vehicle), and estimating the interference level based on the measurement of the radio activity. Alternatively or additionally, the estimation of the level of interference may be based on measurements performed by other entities, e.g., the one or more further transportation vehicles. In this case, the method may comprise receiving 115 one or more wireless messages having a content that is indicative of the level of interference from the one or more further transportation vehicles 200. The one or more wireless messages may be received over the sidelink of the mobile communication system 300. In at least some disclosed embodiments, the levels of interference may be distinguished based on one or more interference thresholds. For example, if two levels of interference are distinguished, a first level of interference may be below an interference threshold, and a second level of interference may exceed the interference threshold. For example, if three levels of interference are distinguished, a first level of interference may be below a first interference threshold, and a second level of interference may exceed the first interference threshold and may be below a second interference threshold, and a third level of interference may exceed the second interference threshold.

For example, the one or more wireless messages having a content that is indicative of the level of interference. For example, the one or more wireless messages may comprise one or more environmental perception messages, i.e., Cooperative Perception Messages (CPM), comprising environmental perception data. For example, the environmental perception data may comprise modeling information for an area surrounding the one or more second transportation vehicles. The modeling information may relate to objects that have been identified by a transportation vehicle of the one or more further transportation vehicles, using one or more perception sensors of the transportation vehicle. For example, the one or more perception sensors of the transportation vehicles may comprise at least one of a RADAR (Radio Detection and Ranging) sensor, a LIDAR (Light Detection and Ranging) sensor, a camera sensor and an ultrasound sensor. For example, an environmental perception model of the environmental perception data may comprise information related to a location and/or of an extent of the objects that have been identified by the respective transportation vehicle using one or more perception sensors of the respective transportation vehicle. Among the objects may, e.g., be other transportation vehicles. The method may comprise identifying one or more transportation vehicles among the objects that have been identified by the respective transportation vehicle, and estimating the level of interference based on the identified transportation vehicles. Additionally, the environmental perception data may indicate locations where natural barriers may influence wireless communication, e.g., by shadowing a location or by creating reflections that influence the level of interference. Accordingly, the method may comprise estimating the level of interference based on natural barriers perceived through the environmental perception data that influence wireless communication.

Furthermore, the one or more wireless messages may comprise one or more maneuver coordination messages (MCM). Maneuver coordination messages may comprise information related one or more planned maneuvers of the one or more further transportation vehicles, such as lane changes, brake applications etc., that are coordinated among the transportation vehicles. Each maneuver may be associated with a specific communication pattern. Accordingly, the method may comprise estimating the level of interference based on the specific communication patterns of one or more maneuvers based on the one or more maneuver coordination massage.

The method comprises selecting 120 the method or mechanism for determining the one or more radio resources based on the level of interference and determining 130 the one or more radio resources to be used for performing a wireless communication over the sidelink of a mobile communication system 300 based on the selected method or mechanism. Disclosed embodiments are based on distinguishing different levels of interference. Each level of interference may be associated with a specific method or mechanism that is to be used for determining the one or more radio resources. For example, in the case of two or three levels of interference, each of the two or three levels of interference may be associated with an element of the group. In disclosed embodiments, the method or mechanism to be used are differentiated by their respective overhead and the handling of collisions.

The method or mechanism is selected among elements of the group of using pre-defined radio resources, using a decentralized coordination of radio resources, and using a base station-based assignment of radio resources. For example, in a three-level scenario, the pre-defined radio resources may be used at the first level, the decentralized coordination may be used at the second level, and the base station-based assignment of radio resources may be used at the third level. In a two-level scenario, the pre-defined radio resources may be used at the first level and the decentralized coordination may be used at the second level. Alternatively, the decentralized coordination may be used at the first level and the base station-based assignment of radio resources may be used at the second level. Alternatively, the pre-defined radio resources may be used at the first level and the base station-based assignment of radio resources may be used at the second level.

For example, if only a low level of interference is to be expected, an easy, random selection-based approach may be used, which has a low overhead, but which might lead to collisions with other participants. As the level of interference is low, i.e., few wireless transmissions are expected in a frequency range of interested, the overall risk of collisions might still be acceptable. Accordingly, when determining the one or more radio resources to be used for the wireless communication using the pre-defined radio resources, the one or more radio resources may be randomly selected from the pre-defined radio resources. The pre-defined radio-resources may comprise a pool of available radio resources, and the one or more radio resources may be (randomly) selected from the pool of available radio resources. In at least some disclosed embodiments, the pre-defined radio-resources may be pre-defined by a base station of the mobile communication system. For example, the pre-defined radio resources may be pre-defined using semi-persistent scheduling (SPS). For example, before the entity/transportation vehicle that executes the method leaves a coverage area of the base station, the base station may provide information related to the pre-defined radio-resources to the entity/transportation vehicles, for use in an out-of-coverage situation. In some cases, the pre-defined radio resources may be specific to the entity/transportation vehicle, or specific to a platoon of transportation vehicles or cluster of transportation vehicles comprising the transportation vehicle. Alternatively, the pre-defined radio resources may be the same for (all) entities communicating via the sidelink of the mobile communication system. In at least some disclosed embodiments, the pre-defined radio resources might not be received from a base station, but might be implicit to the mobile communication system, e.g., to be used in an out-of-coverage scenario.

At an intermediate level of interference, such an approach might not be feasible, as more collisions are to be expected, which may lead to packet loss and delay. In this case, the decentralized coordination of radio resources may be used. In a decentralized coordination of radio resources, not merely a random radio resource is picked, but additional measures are taken to lower or mitigate the risk of collisions. For example, the decentralized coordination of radio resources may be based on using listen-before-talk. When using listen-before-talk, the entity performing the method may sense a radio environment and select the radio resources to be used for the wireless communication based on the sensing of the environment. For example, if the entity performing the method senses a high amount of communication in a frequency band, it may determine the one or more radio resources using a different radio band. Additionally or alternatively, the entity performing the method may sense whether another wireless communication occurs at radio resources that have been previously determined, and postpone the wireless transmission until the other wireless communication has ended. Additionally or alternatively, the decentralized coordination of radio resources may be based on using forward error correction. In forward error correction, the wireless communication is enhanced with redundant data that is to be used to reconstruct missing or distorted portions of the wireless communication at the receiver, e.g., without requiring retransmissions. For example, the forward error correction may be based on Reed-Solomon-Codes. Additionally or alternatively, the decentralized coordination of radio resources may be based on using frequency hopping and/or random hopping, e.g., by using Frequency-Hopping Spread Spectrum (FHSS). Additionally, frequency interleaving may be used, i.e., by spreading the wireless communication over a plurality of frequency ranges.

In at least some disclosed embodiments, the decentralized coordination of radio resources may be based on using a transportation vehicle-specific random seed to determine the one or more radio resources. For example, similar to using the pre-defined radio resources a resource pool of radio resources (e.g., of a plurality of pre-defined pools of radio resources) may be used for determining the one or more radio resources to be used for the wireless communication over the sidelink. Instead of purely randomly selecting the one or more radio resources from the pool of radio resources, each transportation vehicle, may be assigned a vehicle-specific unique identifier that may be used as a seed in the random selection. By using a seed-based random selection algorithm that spreads over the radio resources of the pool of radio resources, the one or more radio resources may be determined using the seed-based random selection algorithm and using the vehicle-specific, unique identifier as seed to the seed-based random selection algorithm. In some disclosed embodiments, the vehicle-specific random seed may be intrinsic to the transportation vehicle, e.g., calculated based on a serial number of the transportation vehicle. Alternatively, the vehicle-specific random seed may be assigned by the mobile communication system.

At a high level of interference, e.g., at the third level, using one of the above approaches might not yield usable results due to frequent collisions. Instead, the base station-based assignment of radio resources. In a base-station based assignment of radio-resources, the one or more radio resources are (centrally) determined by a base station of the mobile communication system. If the entity performing the method is in coverage of a (stationary) base station of the mobile communication system, the base station of the mobile communication system may be used for determining the one or more radio resources. If the entity performing the method is out of coverage of a base station of the mobile communication system, such an assignment may not be available. One of two options might be used: a) In an out-of-coverage scenario, the base station-based assignment of radio resources might not be available. In other words, the method or mechanism may be selected 120 among elements of the group of using pre-defined radio resources and using a decentralized coordination of radio resources (i.e., the first group) while an entity executing the method is out of coverage of a base station of the mobile communication system 300, and the method or mechanism may be selected 120 among elements of the group of using pre-defined radio resources, using a decentralized coordination of radio resources, and using a base station-based assignment of radio resources (i.e., the second group) while the entity 100 executing the method is in coverage of a base station of the mobile communication system 300. The method may comprise determining whether the entity performing the method is in- or out of coverage of a base station of the mobile communication system, and select either a method or mechanism of the first group of methods or mechanisms if the transportation vehicle is out of coverage or of the second group of methods or mechanisms if the transportation vehicle is in coverage.

Alternatively, b) In an out-of-coverage scenario, the entity/transportation vehicle 100 or a transportation vehicle of the one or more further transportation vehicles may act as base station of the mobile communication system and perform the base station-based assignment of radio resources. In other words, the method or mechanism may be selected 120 among elements of the group of using pre-defined radio resources, using a decentralized coordination of radio resources, and using a base station-based assignment of radio resources regardless of whether an entity executing the method is in coverage or out of coverage of a base station of the mobile communication system 300. The base station-based assignment of radio resources may be performed by the transportation vehicle 100 or by a transportation vehicle of the one or more further transportation vehicles 200 acting as a vehicular base station. If the base station-based assignment of radio resources is performed by a transportation vehicle of the one or more further transportation vehicles 200, the method may comprise receiving information related to the one or more radio resources to be used from the transportation vehicle of the one or more further transportation vehicles. If the base station-based assignment of radio resources is performed by the entity/transportation vehicle 100, the method may further comprise assigning 135 (i.e., scheduling) radio resources to be used for performing a further wireless communication over the sidelink of the mobile communication system 300 to the one or more further transportation vehicles. In other words, the method may comprise acting as a (mobile) base station of the mobile communication system by assigning 135 the radio resources to be used for performing the further wireless communication over the sidelink of the mobile communication system 300 to the one or more further transportation vehicles. The method may comprise transmitting information related to the assigned resources to the one or more further transportation vehicles. Furthermore, the method may comprise assigning the one or more radio resources to be used for performing a wireless communication over the sidelink of the mobile communication system 300.

In at least some disclosed embodiments, the method comprises performing 140 the wireless communication over the sidelink of the mobile communication system based on the determined one or more radio resources. For example, the method may comprise using the one or more radio resources for the wireless communication over the sidelink of the mobile communication system.

The interface 12 may correspond to one or more inputs and/or outputs for receiving and/or transmitting information, which may be in digital (bit) values according to a specified code, within a module, between modules or between modules of different entities. The interface is configured to communicate in the mobile communication system. In other words, the interface 12 may be or comprise a wireless transceiver for communicating in the mobile communication system. The wireless transceiver may be implemented as any method or mechanism for transceiving, i.e., receiving and/or transmitting etc., one or more transceiver units, one or more transceiver devices and it may comprise typical receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc.

In disclosed embodiments the control module 14 may be implemented using one or more processing units, one or more processing devices, any method or mechanism for processing, such as a processor, a computer or a programmable hardware component being operable with accordingly adapted software. In other words, the described function of the control module 14 may as well be implemented in software, which is then executed on one or more programmable hardware components. Such hardware components may comprise a general-purpose processor, a Digital Signal Processor (DSP), a micro-controller, etc.

In the context of this application, the terms "being in coverage of a base station of the mobile communication system" or "in coverage scenario" may correspond to the entity performing the method being associated with, camped on, or registered with a base station of the mobile communication system, i.e., the entity performing the method is at that point in time capable of receiving control instructions from the base station of the mobile communication system. In the context of this application, the terms "being out of coverage of a base station of the mobile communication system" or "out-of-coverage scenario" may correspond to the entity performing the method being (temporarily) unable to receive control instructions from a (i.e., any) base station of the mobile communication system.

In at least some disclosed embodiments, the transportation vehicle and/or the one or more further transportation vehicles may be connected transportation vehicles, i.e., autonomous transportation vehicles or semi-autonomous road users transportation vehicles that are configured to communicate with other transportation vehicles or with a backend server to make their driving decisions. For example, the transportation vehicle and/or the one or more further transportation vehicles may be transportation vehicles that are configured to coordinate their autonomous or semi-autonomous driving with other transportation vehicles. In the context of this application, the entity/transportation vehicle performing the method may correspond to the entity/transportation vehicle comprising the apparatus.

The one or more further transportation vehicles and the transportation vehicle may form a cluster of transportation vehicles or may be members of clusters of transportation vehicles. For example, in a cluster of transportation vehicles, members of the cluster may share information, and may drive in a coordinated manner. Within a cluster, a group of transportation vehicles may coordinate driving maneuvers. Among the transportation vehicles of the cluster, cellular vehicle-to-vehicle communication (i.e., intra-cluster communication) may be used to coordinate the cluster. A cluster of transportation vehicles may comprise a cluster head, i.e., a transportation vehicle that coordinates a communication of the cluster of transportation vehicles. For example, the transportation vehicle executing the method may be the cluster head of the cluster of transportation vehicles.

Alternatively, the one or more further transportation vehicles and the transportation vehicle may form a platoon of transportation vehicles or may be members of platoons of transportation vehicles. Grouping transportation vehicles into platoons is an approach for increasing the capacity of roads. Within a platoon, a group of transportation vehicles may be coordinated to accelerate or break simultaneously, allowing for smaller distances between the transportation vehicles. Among the transportation vehicles of the platoon, cellular vehicle-to-vehicle communication may be used to coordinate the platoon of transportation vehicles. A platoon of transportation vehicles may comprise a platoon leader, i.e., a transportation vehicle that determines and controls a velocity and heading of the platoon of transportation vehicles and that transmits and initiates an execution of driving instructions to be executed by transportation vehicles of the platoon of transportation vehicles. The platoon leader may lead the platoon of transportation vehicles. For example, the platoon leader may drive in front of the other transportation vehicles of the platoon of transportation vehicles. In some disclosed embodiments, the transportation vehicle executing the method may be the platoon leader. For example, if the platoon of transportation vehicles is to change lanes on the road or is to perform other driving maneuvers, these maneuvers are initiated by the platoon leader and transmitted to the other transportation vehicles of the platoon of transportation vehicles. In some disclosed embodiments, leadership in a platoon of transportation vehicles might not be bounded to an individual transportation vehicle. For example, the platoon of transportation vehicles might be coordinated by a central entity (e.g., a "cloud" entity) or the leading function may be distributed over a plurality of transportation vehicles. For example, the platoon may comprise a communication manager, i.e., a transportation vehicle that coordinates an inter-platoon communication and/or a communication with transportation vehicles or entities outside the platoon. In some cases, e.g., if the platoon of transportation vehicles is coordinated by a single transportation vehicle, the platoon leader may be the communication manager of the platoon. Alternatively, in a platoon with a distributed leading function, a transportation vehicle being the communication manager may be different from a transportation vehicle that initiates an execution of driving instructions to be executed by transportation vehicles of the platoon of transportation vehicles. For example, the transportation vehicle and/or the other transportation vehicles of the platoon of transportation vehicles may be motorized transportation vehicles, e.g., automobiles, trucks, lorries or motorcycles.

At least some disclosed embodiments focus on an approach on how to organize resources between two or more transportation vehicles in PC5 in an (sudden) out-of-coverage situation, e.g., at an intersection. In a first approach, a method or mechanism for organizing the resources may be selected among a) Sidelink random access b) Predefined Resource Blocks c) One transportation vehicle acts as base station/eNodeB (enhanced Node B, a base station concept in LTE-based mobile communication systems).

Figure 2A:
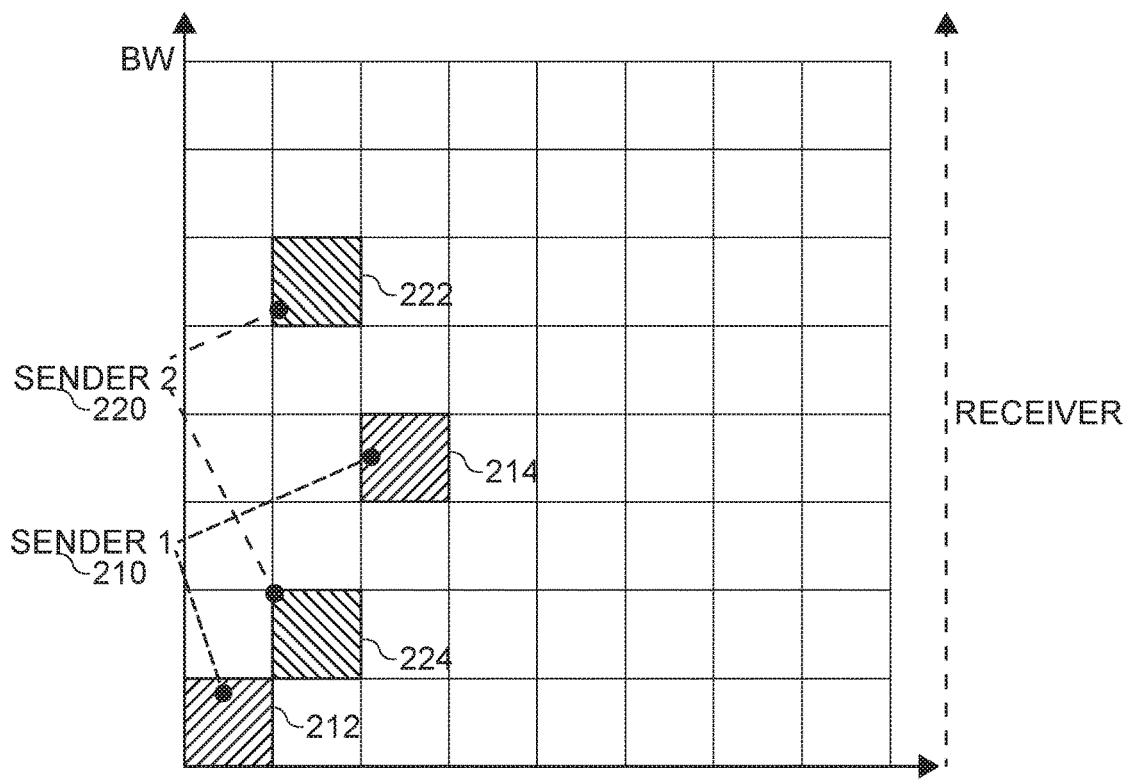
FIGS. 2a and 2b show schematic diagrams of examples of a use of radio resources.
Figure 2B:
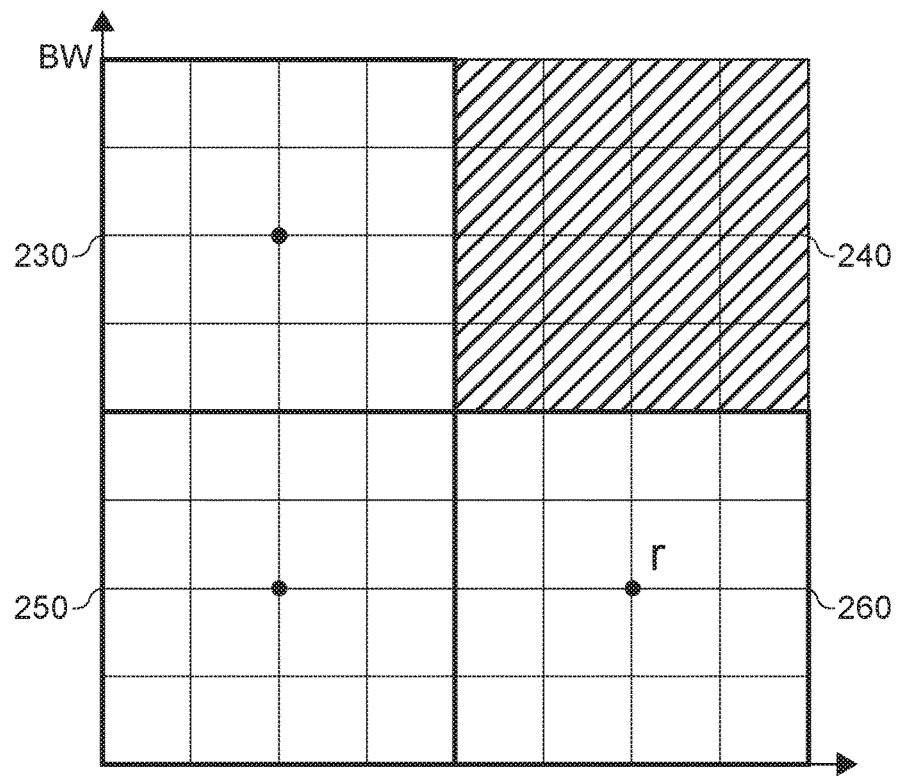

In a second approach, a method or mechanism for organizing the resources may be selected among a) Sense Resources b) Individual (personal) "random" selection based on random preferences FIGS. 2*a* and 2*b* show schematic diagrams of examples of a use of radio resources. FIGS. 2*a* and 2*b* each show a graph depicting a plurality of resource blocks that can be used for wireless communication. The x-axis denotes the time (in slots), while the y-axis denotes the bandwidth (BW).

In FIG. 2*a*, Sender 1 210 and Sender 2 220 perform a wireless communication using resource blocks of the plurality of resources blocks. Sender 1 uses two resources blocks 212; 214 that use different frequencies and that use different time slots (e.g., using frequency interleaving), and Sender 2 uses two resource blocks 222; 224 that use the same time slot, but different resource blocks (e.g., using frequency hopping). The transmitted wireless communication is received by a receiver.

In FIG. 2b, the plurality of resource blocks are partitioned into four quadrants, 230; 240; 250; 260, each comprising a subset of the plurality of resource blocks. For example, the four quadrants may be pre-assigned using sensing-based semi-persistent scheduling (SB-SPS), e.g., so that quadrants 230; 250 and 260 are to be used for random access on the sidelink (e.g., for the wireless communication), and quadrant 240 is to be used for another form of communication, e.g., periodic beacons.

As already mentioned, in disclosed embodiments the respective methods may be implemented as computer programs or codes, which can be executed on a respective hardware. Hence, another disclosed embodiment is a computer program having a program code for performing at least one of the above methods, when the computer program is executed on a computer, a processor, or a programmable hardware component. A further disclosed embodiment is a computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some disclosed embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the methods described herein or (field) programmable logic arrays ((F)PLAs) or (field) programmable gate arrays ((F)PGAs), programmed to perform the above-described methods.

The description and drawings merely illustrate the principles of the disclosed embodiments. It will thus be appreciated that those skilled in the art will be able to devise various arrangements that, although not explicitly described or shown herein, embody the principles of the disclosure and are included within its scope. Furthermore, all examples recited herein are principally intended expressly to be only for pedagogical purposes to aid the reader in understanding the principles of the disclosure and the concepts contributed to furthering the art, and are to be construed as being without limitation to such specifically recited examples and conditions.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate disclosed embodiment. While each claim may stand on its own as a separate disclosed embodiment, it is to be noted that—although a dependent claim may refer in the claims to a specific combination with one or more other claims—other disclosed embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective operations of these methods.

LIST OF REFERENCE SIGNS

10 Apparatus
12 Interface
14 Control module
100 Entity/transportation vehicle
110 Estimating a level of interference
115 Receiving one or more wireless messages
120 Selecting a method or mechanism
130 Determining one or more radio resources
135 Assigning radio resources
140 Performing a wireless communication
200 One or more further transportation vehicles
210 Sender 1
212; 214 Resource blocks
220 Sender 2
222; 224 Resource blocks
230; 240; 250; 260 Quadrants of schematic diagram
300 Mobile communication system

The invention claimed is:

1. An apparatus for determining one or more radio resources for performing a wireless communication over a sidelink of a mobile communication system, the apparatus comprising:
    an interface for communicating in the mobile communication system; and
    a control module configured to:
        estimate a level of interference,
        select how to determine the one or more radio resources based on the estimated level of interference,
        wherein the selection selects from using pre-defined radio resources, using a decentralized coordination of radio resources, and using a base station-based assignment of radio resources to determine the one or more radio resources to be used for performing the wireless communication over the sidelink of the mobile communication system, wherein three levels of interference are distinguished when determining the level of interference including a first level, a second level, and a third level, wherein the control module uses the pre-defined radio resources in response to the estimated level of interference being at the first level, wherein the control module uses decentralized coordination in response to the estimated level of interference being at the second level, and wherein the control module uses the base station-based assignment of radio resources in response to the estimated level of interference being at the third level.

2. The apparatus of claim 1, wherein the third level of interference indicates a higher intensity of the interference than the second level of interference, wherein the second level of interference indicates a higher level of interference than the first level of interference.

3. The apparatus of claim 1, wherein the selection selects from either using pre-defined radio resources or using a decentralized coordination of radio resources while the apparatus is out of coverage of a base station of the mobile communication system, and wherein the selection selects from using pre-defined radio resources, using a decentralized coordination of radio resources, and using a base station-based assignment of radio resources while the apparatus is in coverage of a base station of the mobile communication system.

4. The apparatus of claim 1, wherein the selection selects from using pre-defined radio resources, using a decentralized coordination of radio resources, and using a base station-based assignment of radio resources regardless of whether the apparatus is in coverage or out of coverage of a base station of the mobile communication system.

5. The apparatus of claim 4, wherein the apparatus is included in a transportation vehicle, wherein the wireless communication over the sidelink of the mobile communication system is a communication between the transportation vehicle and one or more further transportation vehicles, wherein the base station-based assignment of radio resources is performed by the transportation vehicle or by a transportation vehicle of the one or more further transportation vehicles acting as a vehicular base station.

6. The apparatus of claim 5, wherein the control unit is further configured to assign radio resources to be used for performing a further wireless communication over the sidelink of the mobile communication system to the one or more further transportation vehicles.

7. The apparatus of claim 1, wherein the apparatus is included in a transportation vehicle, and/or wherein the wireless communication over the sidelink of the mobile communication system is a communication between the transportation vehicle and one or more further transportation vehicles, and/or wherein the mobile communication system is a vehicular mobile communication system, and/or wherein the wireless communication is one of intra-cluster communication, inter-cluster communication, intra-platoon communication and inter-platoon communication between the transportation vehicle and the one or more further transportation vehicles.

8. The apparatus of claim 1, wherein the decentralized coordination of radio resources is based on one or more elements of the group comprising using listen-before-talk, using forward error correction, using frequency hopping, using frequency interleaving, using random hopping and using a vehicle-specific random seed to determine the one or more radio resources.

9. The apparatus of claim 1, wherein the level of interference is estimated for a position or trajectory of a transportation vehicle including the apparatus.

10. The apparatus of claim 9, wherein the apparatus is included in a transportation vehicle, wherein the wireless communication over the sidelink of the mobile communication system is a communication between the transportation vehicle and one or more further transportation vehicles, wherein the control module is further configured to receive one or more wireless messages having a content that is indicative of the level of interference from the one or more further transportation vehicles.

11. A non-transitory computer readable medium including a computer program having a program code with instructions, which, when executed on a computer process provide functionality of the control module included in the apparatus of claim 1.

12. A method for determining one or more radio resources to be used for performing a wireless communication over a sidelink of a mobile communication system, the method comprising:

estimating a level of interference;

selecting how to determine the one or more radio resources based on the level of interference, wherein the selection selects from using pre-defined radio resources, using a decentralized coordination of radio resources, and using a base station-based assignment of radio resources; and determining the one or more radio resources to be used for performing the wireless communication over the sidelink of the mobile communication system wherein three levels of interference are distinguished when determining the level of interference including a first level, a second level, and a third level, wherein the control module uses the pre-defined radio resources in response to the estimated level of interference being at the first level, wherein the control module uses decentralized coordination in response to the estimated level of interference being at the second level, and wherein the control module uses the base station-based assignment of radio resources in response to the estimated level of interference being at the third level.

13. The method of claim 12, wherein the third level of interference indicates a higher intensity of the interference than the second level of interference, wherein the second level of interference indicates a higher level of interference than the first level of interference.

14. The method of claim 12, wherein the selection selects from either using pre-defined radio resources or using a decentralized coordination of radio resources while an entity executing the method is out of coverage of a base station of the mobile communication system, and wherein the selection selects from using pre-defined radio resources, using a decentralized coordination of radio resources, and using a base station-based assignment of radio resources while the entity executing the method is in coverage of a base station of the mobile communication system.

15. The method of claim 12, wherein the selection selects from using pre-defined radio resources, using a decentralized coordination of radio resources, and using a base station-based assignment of radio resources regardless of whether an entity executing the method is in coverage or out of coverage of a base station of the mobile communication system.

16. The method of claim 15, wherein the method is executed by a transportation vehicle, wherein the wireless communication over the sidelink of the mobile communication system is a communication between the transportation vehicle and one or more further transportation vehicles, wherein the base station-based assignment of radio resources is performed by the transportation vehicle or by a transportation vehicle of the one or more further transportation vehicles acting as a vehicular base station.

17. The method of claim 16, further comprising assigning radio resources to be used for performing a further wireless communication over the sidelink of the mobile communication system to the one or more further transportation vehicles.

18. The method of claim 12, wherein the method is executed by a transportation vehicle,
and/or wherein the wireless communication over the sidelink of the mobile communication system is a communication between the transportation vehicle and one or more further transportation vehicles, and/or wherein the mobile communication system is a vehicular mobile communication system,
and/or wherein the wireless communication is one of intra-cluster communication, inter-cluster communication, intra-platoon communication and inter-platoon communication between the transportation vehicle and the one or more further transportation vehicles.

19. The method of claim 12, wherein the decentralized coordination of radio resources is based on one or more elements of the group comprising using listen-before-talk, using forward error correction, using frequency hopping, using frequency interleaving, using random hopping and using a vehicle-specific random seed to determine the one or more radio resources.

20. The method of claim 12, wherein the level of interference is estimated for a position or trajectory of a transportation vehicle executing the method.

21. The method of claim 20, wherein the method is executed by a transportation vehicle, wherein the wireless communication over the sidelink of the mobile communication system is a communication between the transportation vehicle and one or more further transportation vehicles, the method comprising receiving one or more wireless messages having a content that is indicative of the level of interference from the one or more further transportation vehicles.

* * * * *